Sept. 4, 1934.　　　　H. MEDIGER　　　　1,972,424
PHOTOGRAPHIC ROLL FILM CARTRIDGE
Filed Nov. 23, 1929
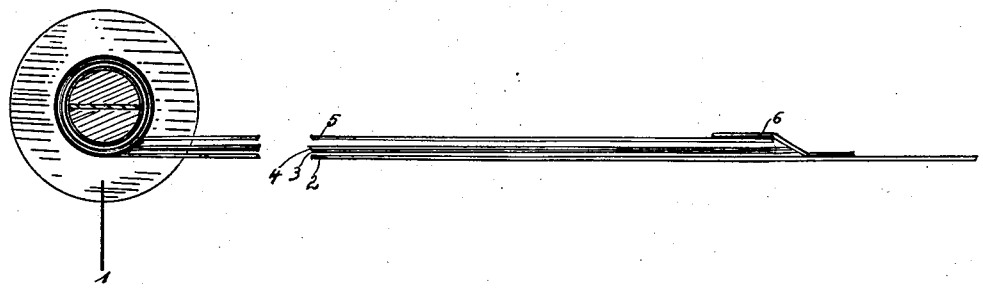
Harald Mediger, Inventor,
By
Philip S. Hopkins, Attorney.

Patented Sept. 4, 1934

1,972,424

UNITED STATES PATENT OFFICE 1,972,424

PHOTOGRAPHIC ROLL-FILM CARTRIDGE

Harald Mediger, Dessau-in-Anhalt, Germany, assignor to Agfa Ansco Corporation, Binghamton, N. Y., a corporation of New York Application November 23, 1929, Serial No. 409,311
In Germany November 29, 1928

2 Claims. (Cl. 95—9)

The present invention relates to a photographic roll-film cartridge, more particularly to a roll-film cartridge in which over the light-sensitive layer is placed a transparent foil made of a material which does not act chemically upon the light-sensitive layer.

Photographic roll-film cartridges are made up by winding closely on a spool a light-sensitive photographic film together with a paper strip. When the film is stored for a prolonged time, the light-sensitive layer becomes fogged by the action of the paper which lies closely upon it.

I found that the action of the paper upon the said layer is suppressed by providing between the layer and the paper a transparent foil made of a substance which does not act chemically upon the light-sensitive layer. This foil may consist of gelatine, a cellulosic material, e. g. regenerated cellulose, a cellulose ester, a mixed cellulose ester, a cellulose ether or a cellulose ether-ester or of any other suitable material.

The fogging action of the paper particularly damages panchromatic emulsions which are generally exposed behind a light filter. In this case the protective foil can be colored in the color required for the filter so as to act as a light filter, whereby the use of a filter placed before the objective is rendered unnecessary.

The sheet serving as a protective layer and as a light-filter is preferably attached to the black and red protective paper together with the film strip by one and the same adhesive strip. Alternatively, it may be attached in any other suitable manner.

My invention is illustrated by the accompanying drawing which represents a view in cross-section of a roll film cartridge according to the present invention, a part of the photographic film being unrolled for the purpose of better showing the layers of which it is composed. The details of the roll film cartridge are identified as follows:

1 is the film-spool,
2 is the protective paper strip. The roll-film consists of the support 3 and of the light-sensitive layer 4.
5 is the transparent protecting foil which is placed over the light-sensitive layer and may be colored in order to serve as a light-filter,
6 is the adhesive strip which attaches the film and the transparent foil to the protective paper.

I claim:

1. In a photographic film cartridge, a spool and closely wound on the spool a photographic film consisting of a protective paper strip, placed over said paper strip a separate support bearing on its opposite side a layer of light-sensitive material and placed over said light-sensitive material a separate, readily removable, transparent sheet made of a material which does not act chemically upon the light-sensitive layer, said transparent sheet forming one single piece extending over the whole length of said layer of light-sensitive material and being uniformly colored to act as a light filter.

2. In a photographic film cartridge, a spool and closely wound on the spool a photographic film consisting of a protective paper strip, placed over said paper strip a separate support bearing on its opposite side a layer of light-sensitive material and placed over said light-sensitive material a separate, readily removable, transparent sheet made of a cellulosic material, said transparent sheet forming one single piece extending over the whole length of said layer of light sensitive material and being uniformly colored to act as a light filter.

HARALD MEDIGER.